United States Patent [19]

Connolly

[11] Patent Number: 4,815,234
[45] Date of Patent: Mar. 28, 1989

[54] METHOD AND APPARATUS FOR DESTROYING FIRE ANTS AND FIRE ANT BEDS

[75] Inventor: John C. Connolly, Houston, Tex.

[73] Assignee: The Fireanster Corporation, Houston, Tex.

[21] Appl. No.: 208,835

[22] Filed: Jun. 9, 1988

Related U.S. Application Data

[63] Continuation of Ser. No. 861,115, May 6, 1986, abandoned, which is a continuation-in-part of Ser. No. 619,494, Jun. 11, 1984, abandoned.

[51] Int. Cl.⁴ .................... A01M 1/00; A01M 7/00
[52] U.S. Cl. ........................................ 43/132.1; 172/42
[58] Field of Search .................. 43/138, 124, 132.1, 43/900; 111/6, 7, 7.4, 7.1, 7.2; 47/1.42; 239/164, 743; 172/42, 43, 111, 59

[56] References Cited

U.S. PATENT DOCUMENTS

| 835,357 | 11/1906 | Janeway | 43/124 |
|---|---|---|---|
| 992,140 | 5/1911 | Anderberg | 111/6 |
| 1,037,623 | 9/1912 | Hinsky | 43/900 |
| 1,093,786 | 4/1914 | Korthauer | 111/7 |
| 1,234,214 | 7/1917 | Reynolds | |
| 1,486,548 | 3/1924 | Schrum | 172/42 |
| 1,982,974 | 12/1934 | Aiken | 43/124 |
| 2,059,835 | 11/1936 | Worthing et al. | |
| 2,114,494 | 4/1938 | Hummel et al. | |
| 2,410,273 | 10/1946 | Deubner | 172/42 |
| 2,601,277 | 6/1952 | Green | 111/7 |
| 3,774,556 | 11/1973 | Poll | 43/124 |
| 3,774,688 | 11/1973 | Van der Lely | 172/111 |
| 3,886,874 | 6/1975 | Platz | 111/7.4 |
| 4,018,170 | 4/1977 | Van der Lely | 111/7 |
| 4,108,089 | 8/1978 | Van der Lely | 111/7 |
| 4,160,336 | 7/1979 | Query et al. | 43/132.1 |
| 4,519,459 | 5/1985 | Reaume | 172/42 |

Primary Examiner—Gene P. Crosby
Attorney, Agent, or Firm—Pravel, Gambrell, Hewitt, Kimball & Krieger

[57] ABSTRACT

Apparatus for destroying fire ants includes a rotatable ant bed destruction member and apparatus for rotating such destruction member into an ant bed; a fluid delivery assembly is provided for delivering water, ambient or at extremely hot temperatures; or other fluid, to the rotatable destruction member to drown and otherwise kill the ants while the rotatable destruction member destroys the ant bed. The method of this invention is practiced by simultaneously moving the ant bed destruction member into the bed and delivering a stream of fluid into the ant bed sufficient to co-act with the destruction member to destroy the ant bed.

17 Claims, 5 Drawing Sheets

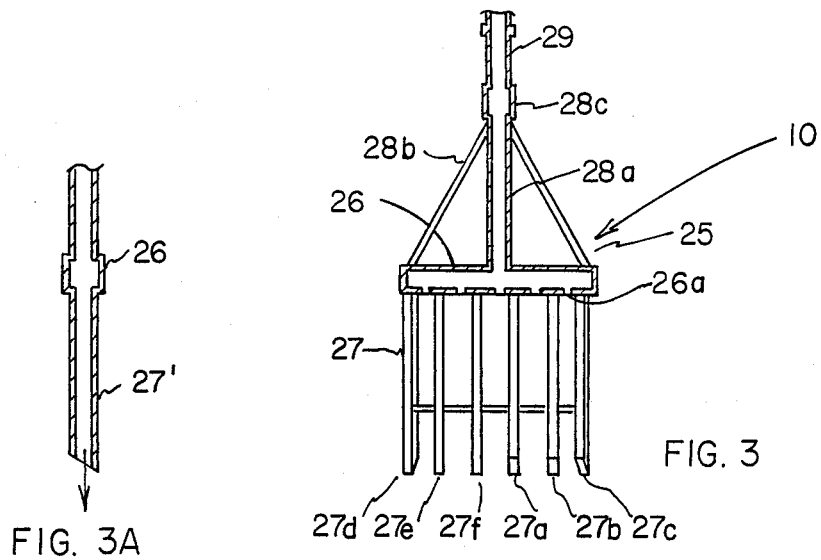
FIG. 3A
FIG. 3
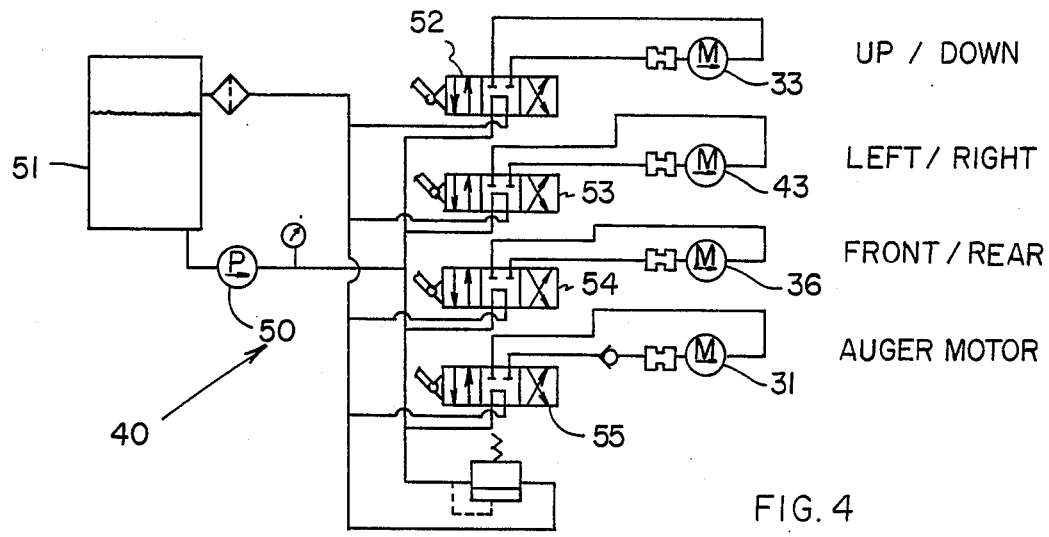
FIG. 4
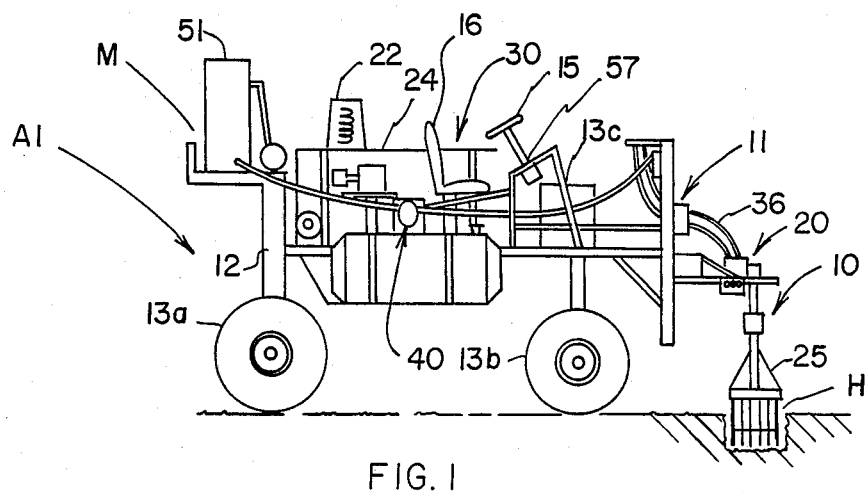
FIG. 1

METHOD AND APPARATUS FOR DESTROYING FIRE ANTS AND FIRE ANT BEDS

This is a continuation of copending application Ser. No. 861,115, filed on May 6, 1986, now abandoned, which is a continuation-in-part of a previously filed and co-pending application by John C. Connolly, Ser. No. 619,494, filed June 11, 1984, for Method and Apparatus for Destroying Fire Ants and Fire Ant Beds, now abandoned and incorporated herein as if fully set forth.

TECHNICAL FIELD OF THE INVENTION

The field of this invention relates to the destruction of ants and ant beds and in particular fire ants and fire ant beds.

BACKGROUND OF THE INVENTION

Since fire ants first arrived in the United States from South America in Mobile, AL in about 1940, they have spread assiduously throughout the Southwest. The imported fire ants are so dominant as compared to native species of fire ants that several of the native ant species have been virtually annihilated by the intruders. Imported fire ants are carnivorous and predatory to insects, livestock, young poultry and even attack sapling citrus and apple trees. Fire ant venom has been known to cause deadly allergic reaction in human beings and fire ants are known to be responsible for at least several deaths. Although all fire ants have always been an annoyance, the imported fire ants are a problem of great consequence. While the invention to be disclosed herein is applicable to all ants who live in beds, it is especially important as a solution to the burgeoning imported fire ant problem.

Fire ants and fire ant colonies or ant beds spread rapidly throughout an area. It has been generally observed that fire ants will form about 50 mature mounds or ant beds in about 2 years on each acre infested. The average height of a fire ant hill is about 10 inches but they are known to be built as high as 3 feet. These ant beds are menaces to the mowing equipment of farmers.

The mounds themselves plus the viciousness of the insect cause cattle to keep their distance and thus the number of acres necessary to graze each head of cattle is increased in an area where fire ants are active. The fire ants even infest farm products such as hay to the extent that cattle will stay away from eating. Fire ants also eat soybeans and have been known to destroy as much as 5-9 bushels per acre of soybean production, which is normally about 25-30 bushels per acre.

Various means have been devised in an attempt to control fire ants. It is known to utilize various chemicals which are placed over the fire ant beds in the hopes of killing the fire ants. These chemicals are extremely powerful and may have adverse effects on the ground and environment in general over a period of time. Further, it is believed that the chemicals generally act quite slowly so that the fire ants, and most importantly the queen, have the opportunity to escape from the bed before the chemicals can contact the ants. It is known that the search for cure or control of fire ants has continued at an active level for some years without credible success and thus the need for a means for destroying and/or controlling fire ants is critical at this time.

SUMMARY OF THE INVENTION

The method of destroying fire ant beds and fire ants according to this invention comprises the steps of positioning an ant bed destruction member over an ant bed; moving the ant bed destruction member into engagement with the ant bed in order to destroy the raised portion of the ant bed and the honeycomb earthen structure within; and, delivering a stream of fluid into the ant bed sufficient to cooperate with the destruction member to destroy the structure of the ant bed and to drown the ants therein.

The apparatus of this invention provided for destroying ant beds and the ants therein comprises an ant bed engagement means for location over an ant bed and manipulation means for moving the ant bed engagement means into engagement with the ant bed in order to destroy the ant bed honeycomb structure; and, fluid delivery means are mounted with the ant bed engagement means for delivering fluid into the ant bed as said ant bed engagement means is directed into the ant bed whereby the structure of the ant bed is destroyed and the ants therein are drowned.

This summary of the invention should be considered as only an outline of the broad features of the invention. The details of the invention and the scope of patent protection sought will be set out hereinafter.

BRIEF DESCRIPTION OF THE DRAWINGS

FIG. 1 is a side view in schematic of a first embodiment of the apparatus for destroying ant beds;

FIG. 3 is a side view partially in section of the ant bed destruction member of this invention;

FIG. 3A is a side view of an alternate embodiment of the blades of the device of FIG. 3;

FIG. 4 is a schematic diagram of the hydraulic power system of this invention;

DESCRIPTION OF THE PREFERRED EMBODIMENT

Figure 2:
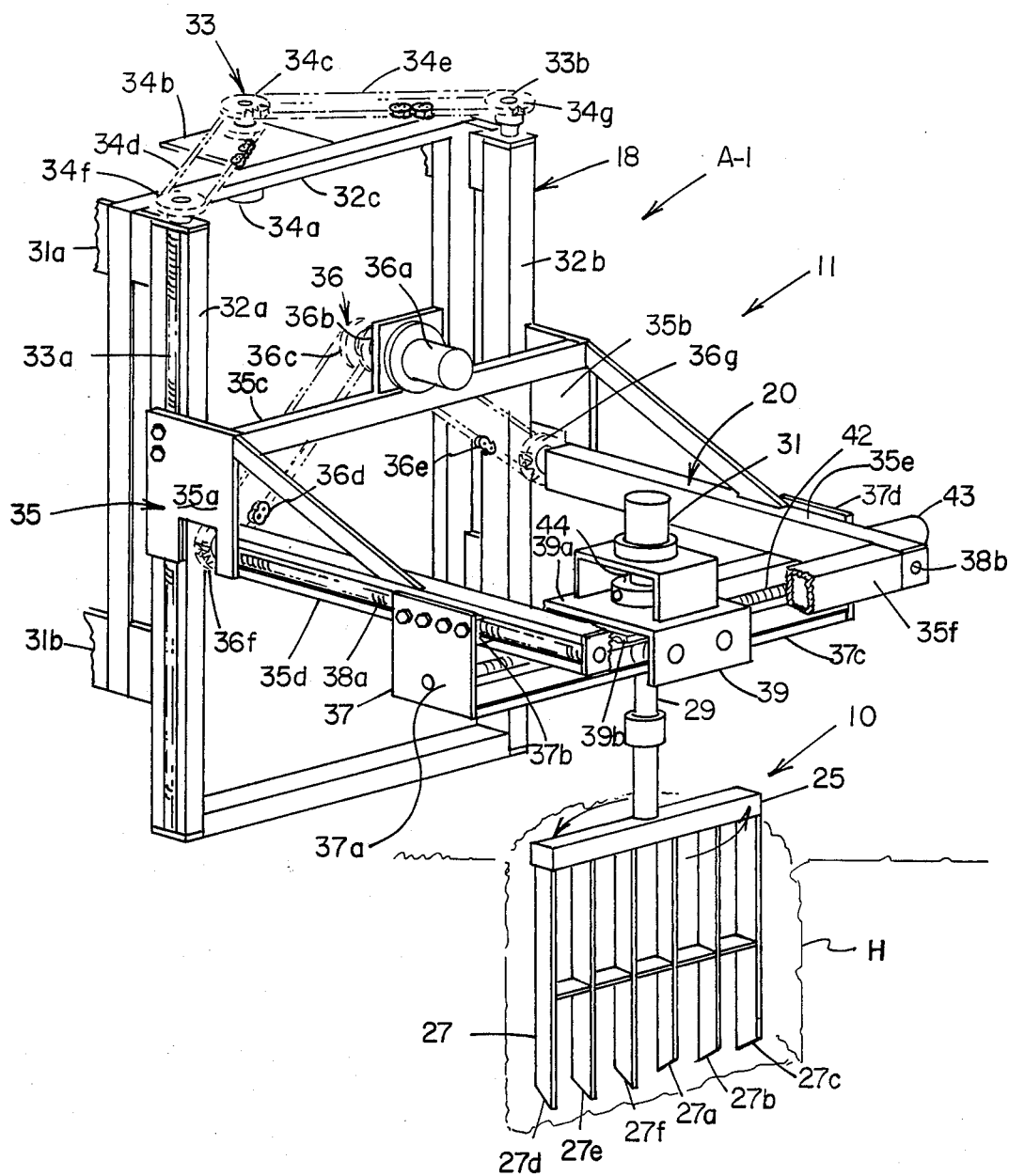
FIG. 2 is an isometric view of the front end portion of the apparatus of FIG. 1 illustrating the manipulation of the ant bed destruction member.

Referring to the drawings, the apparatus A-1 illustrated in FIGS. 1-4, the apparatus A-2 illustrated in FIGS. 5-8, and the apparatus A-3 illustrated in FIGS.

9-13, comprise three devices for moving through a field and location over an ant bed H, boring into the ant bed and simultaneously applying fluid to the ant bed in order to destroy the structure of the ant bed and the ants inside. The term ant bed is used herein to include an ant bed formed by an ant colony in the ground and the mound or hill of the bed arising above the ground. Typically, the ants form a honeycomb earth structure containing enumerable passageways both in the hill and bed portion below the ground.

Basically, the apparatus A-1 of this invention includes an ant bed engagement means generally designated as 10 for location over an ant bed and a manipulation means generally designated as 11 for moving the ant bed engagement means 10 into engagement with the earth of the ant bed in order to destroy the raised portion or mound or hill, if any, of the ant bed H as well as the honeycomb structure therein. Referring to FIG. 1, the apparatus A-1 is a self-propelled mobile unit M which includes a vehicle frame 12 having sets of wheels 13a and 13b which are driven by a suitable motor schematically shown as 13c and steered by a known steering mechanism generally designated as 15. The mobile unit M is operable by an operator sitting in chair 16 to move about a field in order to position the ant bed engagement means 10 over an ant bed.

The manipulation means 11 further includes a vertical drive means generally designated as 18 for moving the ant bed engagement means 10 downwardly into engagement with the ant bed H and a rotational drive means 30 generally designated as 20 for rotating the ant bed engagement means 10 as it is moved downwardly into the ant bed. A fluid delivery means 30 is mounted onto the mobile unit or vehicle M and with the fluid engagement means 10 in order to deliver fluid downwardly into the ant bed as the fluid engagement means 10 moves downwardly and rotates into the ant bed.

A fluid heater means generally designated as 22 is mounted onto the frame generally designated as 12 of the mobile unit M in fluid communication with a supply fluid tank 24 for the purpose of heating the fluid to be delivered to the ant bed engagement means 10 in order to kill at least some portion of the ants by heat or steam vapor.

The ant bed engagement means generally designated as 10 is illustrated in detail in FIG. 3. The ant bed engagement means is a rotatable destruction member or fork 25 formed of a hollow transverse support member 26 having mounted and depending downwardly therefrom a plurality of cutting blades 27. In the embodiment illustrated in FIGS. 2 and 3, cutting blades 27a, 27b and 27c form a first set of cutting blades having at their bottom portion or end an angled cutting edge for engaging the ant bed. Cutting blades 27d, 27e and 27f form a second set of cutting blades having at their bottom end oppositely angled cutting edges. The cutting edges of the first set 27a-c of cutting blades is oppositely angled from the second set of cutting blades 27d-f in order to provide cutting action in the direction of counter-clockwise rotation of the destruction member or fork 25. End cutting blades 27c and 27d are angled with respect to the other blades so that these end blades, which are parallel to each other, effectively engage the earth during rotation. The transverse support member 26 for the destruction member 25 is attached to a hollow vertically extending support 28a which is in fluid communication with the interior of the transverse support 26. The vertical support 28a is braced by braces 28b and is connected through coupling 28c to a hollow drive shaft 29 which extends into a driving engagement with the rotational drive means 20. The horizontal support member 26 includes a plurality of openings 26a positioned between the individual blades of 27a-27f to direct fluid flowing down from hollow drive shaft 29, coupling 28c and vertical support 28a into the horizontal support member 26 downwardly in proximity to the blades 27a-f.

Referring to 3A, an alternate structure for each of the blades 27a-27f is illustrated and is identified as 27'. In this alternate embodiment, the blades 27' differ from the blades 27 only in that the blades are hollow and thus transmit fluid from the support member 26 downwardly through the blades so that the fluid exits through openings at the lower angled end thereof.

Referring to FIGS. 1 and 2, the mobile unit or vehicle M has attached to the front of the unit a fixed frame including horizontal frame members 31a and 31b which are, though not shown, positioned on either side of the front of the unit M and extend forwardly into attachment with oppositely positioned vertical frame members 32a and 32b. The fixed frame members 31a and 31b located on each side of the unit M are secured to the frame 12 of the unit M in any well-known manner, which is not shown.

A vertical motion drive means generally designated as 33 is mounted with the vertical support members 32a and 32b for moving upwardly and downwardly a vertical motion frame generally designated as 35. The vertical drive means 33 includes a first threaded shaft 33a mounted for rotation by suitable bearing means in a known manner with the vertical support 32a. A second threaded shaft 33b is mounted for rotation using suitable bearing mounting elements with the fixed vertical support 32b. The threaded shafts 33a and 33b are driven by a hydraulic motor 34a mounted onto a motor support plate 34b which is attached to a transverse fixed frame member 32c which extends between the vertical supports 32a and 32b. The hydraulic motor 34a is drivingly connected to a drive sprocket 34c which is connected by chains 34d and 34e to driven sprockets 34f and 34g. The driven sprocket 34f is attached to the threaded shaft 33a to cause rotation of the shaft 33a in response to operation of the hydraulic motor 34a. Similarly, the driven sprocket 34g rotates the vertical shaft 33b. The hydraulic motor 34a is attached by a suitable hydraulic line such as the hydraulic line designated as 36 in FIG. 1 to the hydraulic power supply generally designated as 40 illustrated schematically in FIGS. 1 and 4 and which will be described in further detail hereinafter.

The vertical motion frame 35 includes a side plate 35a which is attached to a nut (not shown) threadedly mounted onto the threaded shaft 33a. The vertical motion frame 35 further includes side plate 35b also attached to a nut, not shown, which is in threaded engagement with the threaded shaft 33b. A transverse frame connecting member 35c is welded onto the side plates 35a and 35b such that the side plates move as a unit. Rotation of the threaded shafts 33a and 33b by operation of the hydraulic motor 34a will cause vertical movement upwardly and downwardly of the vertical motion frame 35. The vertical motion frame or channels 35 further includes forwardly extending support members 35d and 35e. The forwardly extending support member 35d is a U-shaped channel which is welded onto the side plate 35a and extends forwardly. Similarly, the forwardly extending support member 35e is a U-shaped channel which is welded onto the side plate 35b and extends forwardly therefrom. A front transverse square channel 35f is attached to the front end of the channels 35d and 35e. A front/rear drive means generally designated as 36 is mounted with the vertical motion frame member 35c and in operative engagement with a front/rear motion frame 37 for the purpose of moving the front/rear motion frame 37 forwardly and rearwardly. The front/rear drive means 36 includes hydraulic motor 36a mounted on support 36b which is welded onto the transverse support 35c. The hydraulic motor 36a is drivingly coupled by a drive sprocket 36c and through drive chains 36d and 36e to driven sprockets 36f and 36g. The driven sprocket 36f is attached to threaded shaft 38a which is mounted for rotation within the forwardly directed support channel 35d. The driven sprocket 36g is mounted for rotation with a threaded shaft 38b which is mounted for rotation within the forwardly extending channel 35e. In this manner, operation of the hydraulic motor 36a will cause the threaded shafts 38a and 38b to rotate in order to drive the front-/rear motion frame generally designated as 37.

The front/rear motion frame 37 is mounted onto the threaded shafts 38a and 38b for forward and rearward movement in response to rotation of these threaded shafts. The front/rear frame member 37 includes a side plate 37a having mounted thereto a driven nut 37b which is mounted in threaded engagement with the rotatable shaft 38a. A transverse frame member 37c is welded onto the side plate 37a and extends transversely into attachment with an opposing side plate 37d of the front/rear motion frame 37. The side plate 37d also has mounted with it a nut (not shown) which is in threaded engagement with the threaded shaft 38b. In this manner, rotation of the threaded shafts 38a and 38b drives the front/rear frame member forwardly and rearwardly with respect to the mobile unit M.

A transversely extending threaded shaft 42 is mounted between the side plates 37a and 37d for rotation with respect thereto by suitable bearing means. A transverse motion assembly or trolley 39 includes a U-shaped transversely moving support member 39a which is mounted over the threaded shaft 42 and in threaded engagement with the threaded shaft by means of a nut 39b which is in threaded engagement with shaft 42. A hydraulic motor 43 is attached to side plate 37d of the front/rear frame 37 and is drivingly connected to the transverse threaded shaft 42 for the purpose of rotating such shaft and thus driving the trolley 39 from side to side. The support member 39 has inwardly mounted wheels which ride on a track formed by frame member 37c.

The rotational drive means 20 is a hydraulic motor 31 which is mounted onto the transversely moving support plate 39 and is operably attached to the vertically extending, hollow drive shaft 29 which is attached to the rotatable destruction member 25 as previously described. A fluid distribution head 44 is mounted with the hollow drive shaft 29 below the auger motor 31 in order to deliver fluid under pressure from the mobile unit M. The fluid distribution head 44 thus forms part of the fluid delivery means 30. The fluid delivery means 30 includes the fluid supply tank 24 and suitable pumps means for pumping the fluid within the tank through lines, not individually shown, to the fluid distribution head 44 and into the rotatable destruction member 25. A suitable heating coil 22 is mounted in line with the pump and fluid tank 24 for the purpose of heating the fluid to a sufficiently high temperature to kill ants prior to delivery of the fluid to the fluid distribution head 44 and thus to the destruction member 25.

In the embodiment herein illustrated, it is within the scope of this invention to deliver fluid to the destruction member 25 at an ambient temperature or in the alternative to deliver fluid at a sufficiently high temperature to kill ants. It is within the scope of this invention to utilize several types of fluid including water, or a fluid provided with a suitable insecticide. The heating coil 22 utilized to heat the fluid such as water may be of any suitably known variety. The nature of the pump for pumping the fluid from the tank 24 to the fluid distribution head 44 is also within the skill of the art.

A power supply means generally designated as 40 is mounted with the mobile unit or vehicle M and includes hydraulic pump 50 which is connected to a hydraulic fluid supply tank 51 as illustrated in FIGS. 1 and 4. The pump 50 supplies hydraulic fluid under pressure to two-way valves 52-55. Each of the valves 52-55 are connected in hydraulic supply lines which extends to the hydraulic motors 33, 43, 36 and 31, respectively. Thus the two-way valve 52 is connected through suitable hydraulic lines to hydraulic motor 33 for moving the vertical motion frame 35 upwardly and downwardly. The two-way valve 53 is connected through suitable hydraulic lines from the pump 50 to hydraulic motor 43 for moving the trolley member 39 transversely or side-to-side thereby moving the rotating destruction member 25 from side-to-side. The two-way valve 54 is operably connected through suitable hydraulic lines from the pump 50 to hydraulic motor 36 in order to move the front/rear motion frame 37 forwardly and rearwardly. And, the two-way valve 55 is operably connected to the pump 50 and to the hydraulic motor 31 for the purpose of providing clockwise or counterclockwise rotation to the rotatable destruction member 25. A control board is mounted at 57 onto the mobile unit M in proximity to the steering wheel so that an operator sitting in chair 16 can operate the various drive motors 33, 43, 36 and 31 as necessary to move the rotatable destruction member 25.

In operation, the mobile unit M is powered over a field and the rotatable destruction fork is positioned over an ant bed H. The rotatable fork or prong 25 is powered into rotation through operation of two-way valve 55 to drive motor 31 in order to rotate hollow shaft 29 and the destruction member or prong 25 attached thereto. The fluid delivery means generally designated as 30 is activated to pump fluid such as cold water or heated water through the fluid distribution head 44 and the hollow rotating shaft 29 and into the rotatable fork 25. The fluid is distributed through the vertical support 28a and horizontal support 26 and comes out of openings located between the blades 27 such that fluid is directed in proximity to the blades and into the ant bed H as the rotatable fork rotates and moves downwardly. The fork is moved downwardly by actuation of hydraulic motor 33 so that the rotating fork cuts into the ant bed and destroys the honeycomb structure of the ant bed.

One of the problems with ant beds built by fire ants is the porous, honeycomb structure of the interior of the bed can cause problems to animals walking on the bed when saturated from rain. The cutting action of the blades will actually destroy the honeycomb structure so that after the bed is dried out, the former ant bed earth will be more firm for walking on by animals after future rain. The rotating fork 25 cuts a cylindrical area or section into the ground and the simultaneous delivery of fluid through the rotating fork serves to enhance the destruction of the honeycomb structure of the ant bed and at the same time drowning the ants. If fluid is used of sufficiently high temperature as described, an additional killing acting will take place due to the heat of the fluid. Additionally, fluid at boiling temperature will cause vapors to come off of the delivered fluid. The vapors penetrate into honeycomb structure not destroyed and kill ants therein. In this manner, the bed is quickly destroyed in its structure and the ants are very quickly destroyed so that they do not have a chance to leave the ant bed. Even if the ants leave the bed, the vapors or steam can penetrate escape pathways for some distance and kill escaping ants. The apparatus A-1 of this invention thus provides an effective, quick and safe way to destroy the ants and the ant beds created by ants such as fire ants.

The cutting and pulverizing action of the rotating blades cooperating with the addition of fluid to the bed causes a destruction of the bed and a "homogenizing" of the ant bed dirt and water into a thick mud with trap the ants below the surface and enhances drowning of the ants.

During destruction of the bed H, the location of the destruction member 25 can be adjusted forwardly/rearwardly by activation of motor 36a or sideways by activation of motor 43, thus moving the destruction member within the bed to be certain all parts of the bed are destroyed. Thus the cylindrical area initially bored into the bed can be enlarged in any direction so that a "generally cylindrical" area of destroyed ant bed may approximate any necessary shape. The zone of destroyed bed will consist of the homogenized mud that will trap the ants inside.

Referring to FIGS. 5-8, an alternate embodiment A-2 of this invention is shown for killing fire ants and destroying fire ant beds. The embodiment A-2 is similar to the embodiment of A-1 except that unit A-2 consists of a mobile power package illustrated in FIG. 8 and designated by the number 60 which is connected through suitable hydraulic and fluid lines (not shown) to a remote hand operated unit designated as 62 in FIGS. 5-7.

Figure 5:
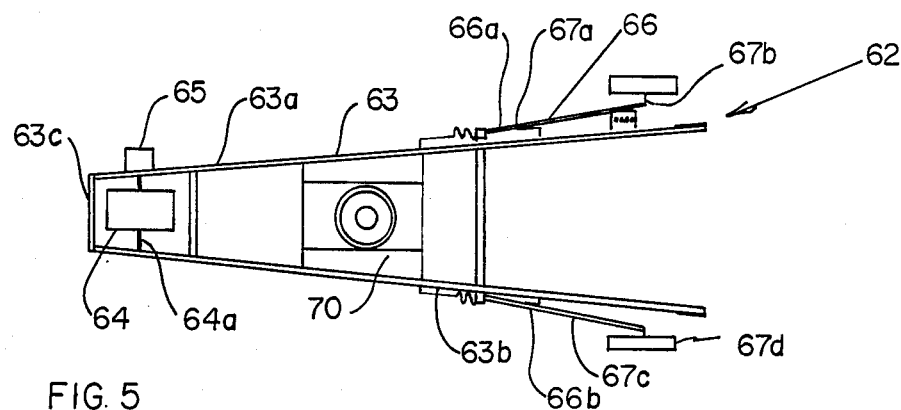
FIG. 5 is a top view of an alternate embodiment of the apparatus of this invention for destroying ants and ant beds which includes a manually operable unit.
Figure 6:
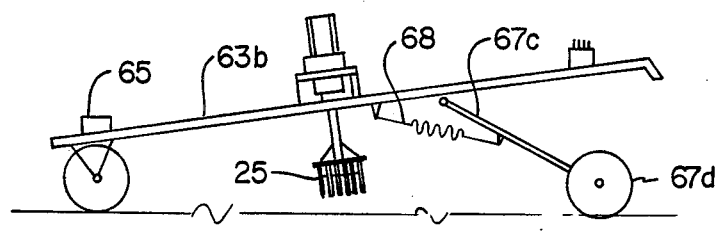
FIG. 6 is a side view of the apparatus of FIG. 5 in position for moving over a field.
Figure 7:
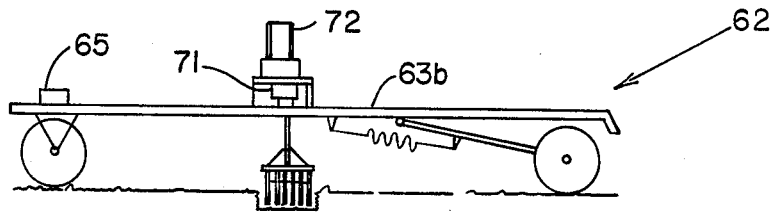
FIG. 7 is a side view of the apparatus of FIG. 5 in an operating position in an ant bed.
Figure 8:
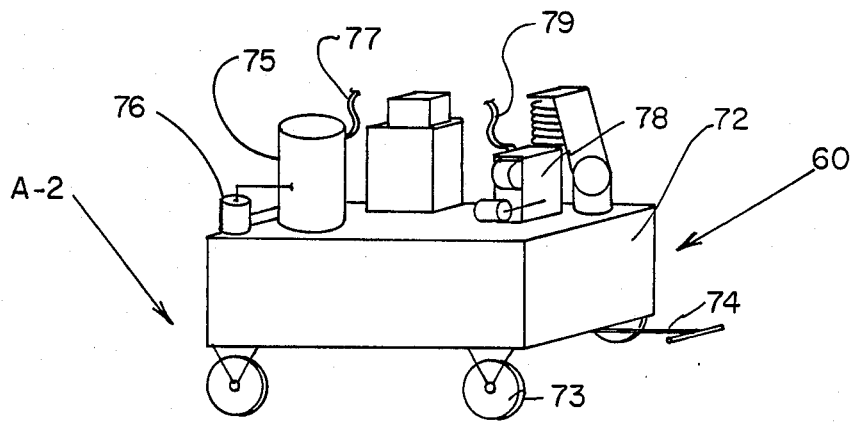
FIG. 8 is an isometric, schematic view of the mobile power package for the hand operated remote unit of FIGS. 5-7.

The remote operating unit 62 includes a Y-shaped frame 63 as illustrated in FIG. 5. The Y-shaped frame includes first and second frame members 63a and 63b which terminate in upper end portions which may be gripped by the operator. The frame members 63a and 63b converge into connection with a front end portion 63c. A front end wheel 64 is mounted for rotation between the members 63a and 63b adjacent to the front end member 63c. A motor drive 65 is operably connected in a known manner to shaft 64a for the wheel 64 in order to drive the wheel and thus the unit 62.

A two-wheel support assembly 66 is mounted with the Y-shaped frame 63 for the purpose of yieldably supporting the entire frame 63 in various positions. The two-wheel support assembly 66 includes first and second wheel support assemblies 66a and 66b mounted onto the frame members 63a and 63b, respectively, to hold the entire frame 63 in the normally traveling position illustrated in FIG. 6. The wheel assembly 66a includes a wheel support shaft 67a which is mounted onto the frame member 63a by a suitable pivotal connection such as a pin. The wheel support shaft 67a terminates in a lower wheel 67b suitably mounted at the end of the shaft 67a by a wheel mounting. The wheel support shaft 67a is held in the resilient position of FIG. 6 for yieldable movement of the entire frame downwardly in a manner to be described with respect to the wheel support assembly 66b illustrated in FIGS. 5-7.

The wheel support assembly 66b includes a wheel support shaft 67c which is mounted pivotally by a suitable pin or the like to the frame member 63b. The wheel support shaft 67c terminates in its lower end in a wheel 67d which is mounted by suitable axle mounting at the end of the support shaft 67c. The wheel support shaft 67c is resiliently held in the traveling position of FIG. 6 by a suitable frame spring 68 which extends between the frame 63b and the wheel support shaft 67c. The spring 68 is pivotally mounted onto the wheel support shaft 67c and onto the frame member 63d in order to pivotally move with respect to both. The resilience of the spring 68 is such that the wheel support shaft 67c is normally held in the travel position of FIG. 6 so that the entire hand-held unit 62 can be moved about without the destruction member 25 engaging the ground. When it is desirable to lower the Y-shaped frame downwardly such that the destruction member 25 moves downwardly into an ant bed H, the operator presses down upon the frame members 63a and 63b against the resilience of the spring 68 mounted on the wheel support shaft 67c and on a similar spring (not shown) mounted on the wheel support shaft 67a such that the unit can be forced downwardly toward the ground. It should be understood that the other suitable mounting and wheel mechanisms may be utilized to provide for travel and lowering of the Y-shaped frame member 63 downwardly so that the destruction member 65 can be rotated into an ant bed.

The rotatable destruction member 25 is of the same structure as previously described and as illustrated in FIG. 3 and thus the same number is used to describe the member. The member or fork 25 is mounted for rotation with respect to the frame members 63a and 63b by a frame platform 70 which is located intermediately between the frame members 63a and 63b. The support plateform 70 mounts a fluid distribution head 71 and a hydraulic motor 72 which provide for rotation of the rotatable destruction member or prong 25 and the delivery of fluid simultaneously therewith.

The mobile power package 60 includes a main water tank 72 mounted on wheels 73 which is manipulable by handle 74. The power package 60 includes a heating coil 75 which is in fluid connection with the fluid tank 72 through a pump 76 such that heated fluid is delivered to line 77 which extends to the fluid distribution head 71 in FIG. 7. The hydraulic motor and supply assembly generally designated as 78 is attached through suitable lines generally designated as 79 which extend to the hydraulic motors 72 and 65 to rotate the rotatable prong 25 and drive forward the entire remote operating unit 62.

In this manner, the mobile power package 60 can be moved into position in a field and the remote operating unit 62 can be moved around in a radius approximately the length of the connecting lines such as 77 and 79 in order to destroy ant beds within a perimeter area.

Further, it is within the scope of this invention to utilize gasoline driven motors for motors 65 and 72 so that the only hose extending from the mobile power package 60 is the fluid hose for heated or ambient temperature water to be distributed through head 25. Also, it is within the scope of this invention to use only a gasoline driven motor or other motor at 72 to drive the unit as well as rotate the fork 25. In such embodiment, no motor is used to drive the entire unit 62, which is moved about solely by hand. Also, the water can be supplied in various ways, depending upon application and need, utilizing the principles of this invention.

The method of this invention is practiced by positioning the ant bed destruction member 25 over the ant bed and moving the member 25 into a cutting engagement with the ant bed by hand lowering the frame 63 in order to destroy the honeycomb structure of the ant bed. Simultaneously, fluid is delivered through the destruction member 25 into the ant bed to cooperate and destroy the honeycomb structure of the ant bed and drowning the ants. In one version, the fluid delivered through the destruction member of prong 25 as it is rotated into the ant bed is heated to a sufficiently high temperature to also aid in killing the ants by heat of the water and steam. The simultaneous delivery of fluid in cooperation with rotation and downward movement of the rotating fork 25 into the ant bed acts to destroy the ant bed and to kill the ants therein very quickly so that a substantial portion of the ant community within the ant bed is killed. The rotation of the rotatable prong or head into the ant bed in cooperation with the delivery of the fluid serves to create a generally cylindrical area or section within the ant bed wherein the honeycomb structure of the ant bed is totally destroyed and all the ants therein are killed by drowning and/or by heat if the fluid is heated. Thus, the method and apparatus of this invention act to provide a simple, safe and efficient way to destroy the ant beds and the ants therein.

Referring to FIGS. 9-13, an alternate embodiment A-3 is shown for destroying fire ant beds. The embodiment A-3 is similar to the embodiments of A-1 and A-2, except that embodiment A-3 utilizes a unique engagement means 104 for cutting into the ant bed and a unique harness 106 and main frame 110 which allows one person to easily move the apparatus about a field, position the apparatus over an ant bed and actuate the engagement means 104 with the ant bed.

Figure 9:
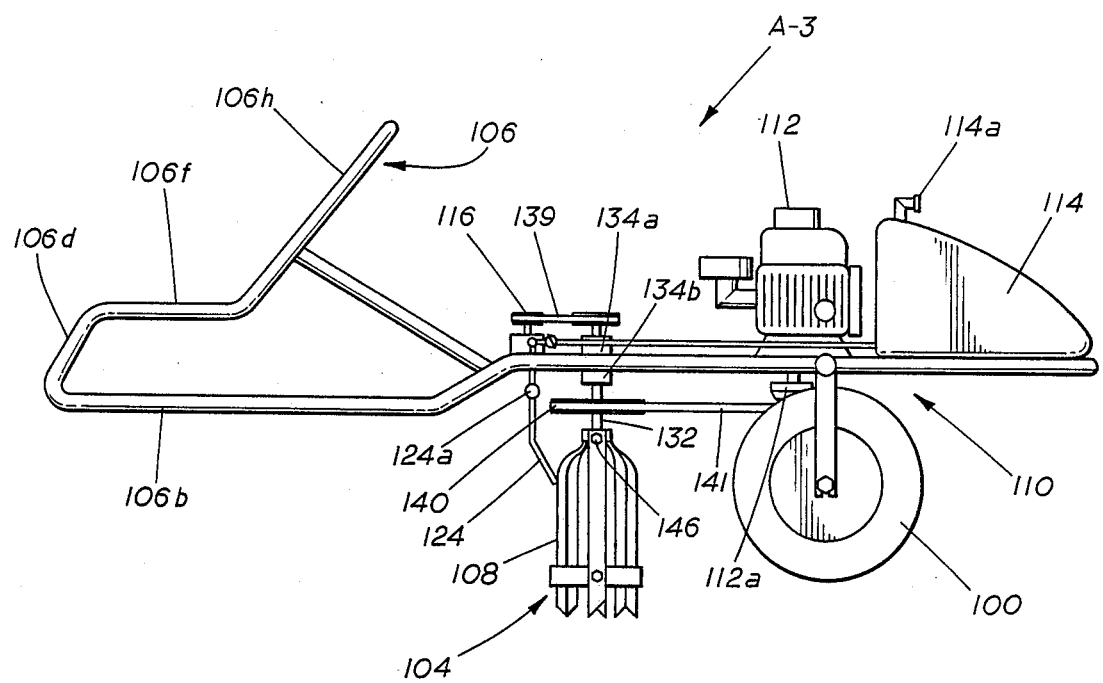
FIG. 9 is a side view of another alternate embodiment of the apparatus of the present invention for destroying ants and ant beds which includes a manually operable unit.

Referring to FIG. 9, it will be noted that embodiment A-3 is designed as a lightweight vehicle for transporting the various components necessary to destroy ant beds by the method outlined herein. Due to the lightweight design, balancing of components over a set of centrally located wheels 100, and the unique harness arrangement 106, embodiment A-3 can easily be moved through a field of ant beds manually by a single operator. The design of the harness 106 further allows a single operator to control the depth and rate of penetration of the engagement means during destruction of an ant bed.

More particularly, the harness 106 used to control the apparatus is devised of a U-shaped frame which a person operating the apparatus can grasp in each hand during use.

Figure 10:
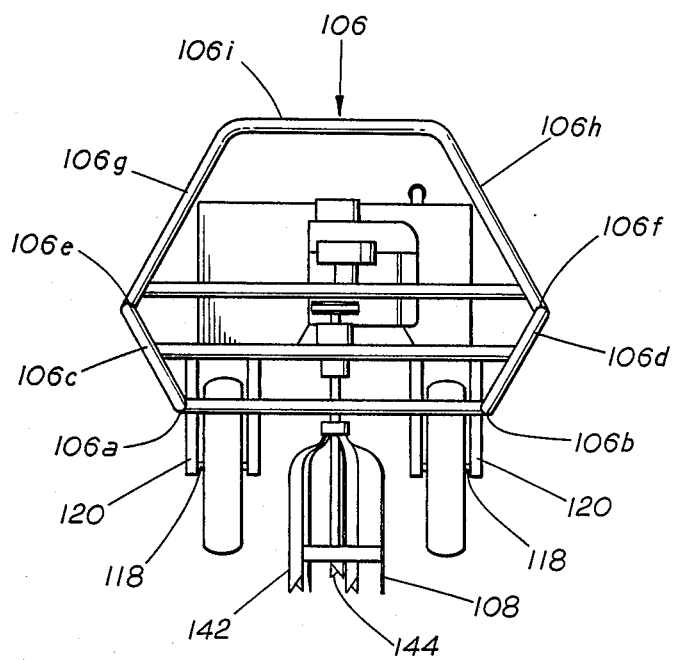
FIG. 10 is the operator end view of the apparatus of FIG. 9.

Referring to FIGS. 9 and 10, the harness 106 includes first horizontal tubular sections 106a and 106b attached to and extending from the main U-shaped frame 110. Sections 106a and 106b connect into inclined sections 106c and 106d, which connect to short horizontal sections 106e and 106f, respectively. Sections 106e and 106f connect to inclined tubular portions 106g and 106h which are joined by cross-member 106i. The operator thus has a number of gripping points in order to more easily maneuver the entire unit.

The ability to grasp the harness at these points makes pushing, pulling, or repositioning the apparatus considerably easier and allows the apparatus to be adapted to persons of varying height and weight. Once the apparatus A-3 is positioned over an ant bed, the engagement means 104 including the destruction member 108 can be engaged to rotate and the operator may again utilize hand positions on the U-shaped frame 106 at points such as 106c-d; 106e-f; 106g-h and 106i along with body weight to control the rate and depth of descent of the destruction member 108.

The harness generally designated as 106 is connected to frame 110 of embodiment A-3. Main frame 110 supports a platform 110a which mounts the destruction member 108, engine 112, fluid tank 114, pump 116 and other components of the apparatus. Due to its weight, the fluid tank 114 and its contents are placed on the frame at the end opposite the harness 106. Wheels 100 are mounted on axles 118 on forks 120 which are attached to main frame 110. Wheels 100 are located along the length of the frame at a position such that the fluid tank 114, engine 112, destruction member 108, and harness 106 are in general balance about the wheels 100. This reduces the weight which must necessarily be lifted by the operator at harness 106 during movement of the apparatus from location to location.

Figure 11:
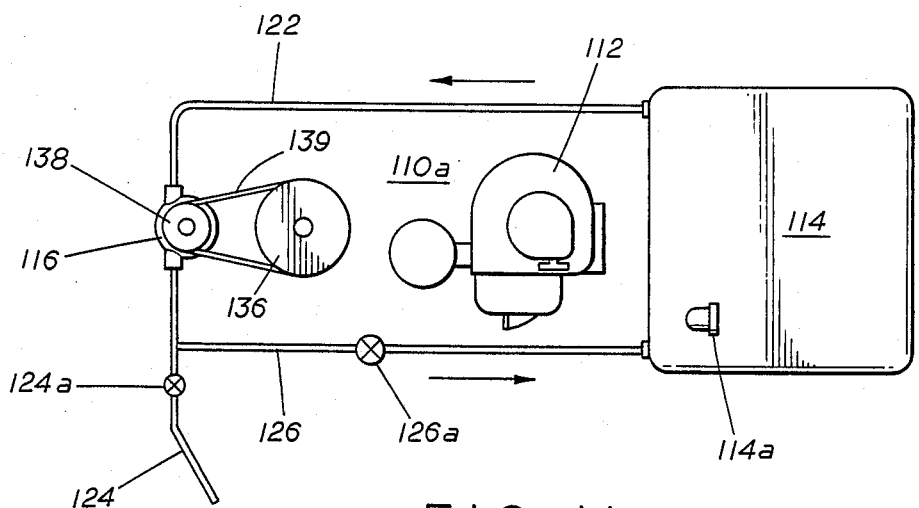
FIG. 11 is a top view of the apparatus of FIG. 9 particularly illustrating the hydraulic circuit.

Referring to FIG. 11, fluid is supplied to the destruction member 108 from fluid tank 114. Fluid tank 114, which is generally triangular in configuration as viewed from the side view of FIG. 9, is connected by conduit 122 to pump 116. A coupling 114a is provided in the top of the tank to attach to a fluid source. Depending on demand, pump 116 supplies fluid to nozzle 124 or to return duct 126, depending on the fluid desired at nozzle 124 as regulated by a valve 124a. Nozzle and tubing 124 is positioned so that fluid may flow into or about the destruction member 128. A valve 126a is mounted in return tubing 126.

Engagement means 104 is mounted on frame platform 110a between harness 106 and wheels 100 so that it may operate as a fulcrum between the weight of fluid in tank 114 and the weight resting on wheels 100 and the harness 106. In that manner, the operator can control the pressure on engagement means 104 with body weight and the weight of the apparatus. The wheels 100 may also be used as a fulcrum for raising the engagement means 104 out of the ant bed.

Engagement means 104 comprises a shaft 132 set in bearings 134a and 134b mounted to main frame platform 110. Shaft 132 extends above main frame 110 and bearing 134a so that it may have mounted thereon a pulley 136. Pulley 136 is operably connected to another pulley 138 on a shaft of pump 116 by a suitable belt drive 139. Shaft 132 extends below main frame 110 and has mounted thereon a support drive pulley 140 connected by suitable belt drive 141 to a drive pulley and shaft 112a of engine 112.

Shaft 132 extends below drive pulley 140 and attaches to destruction member 108. Destruction member 108 is comprised of a first set of blades 142 mounted concentrically outwardly of a second set of blades 144. Each of the blades of sets 142, 144 are made of rectangular steel bars and are disposed radially about shaft 132. The first or outside set of blades 142 comprise three blades 142a which are equally spaced circumferentially about the shaft 132. The second or inside set of blades 144 consists of three blades 144a which are also equally spaced circumferentially about the shaft 132. The blades 144a are located circumferentially between blades 142a so that taken together, there is a blade every 60° about shaft 132.

Figures 12, 13:
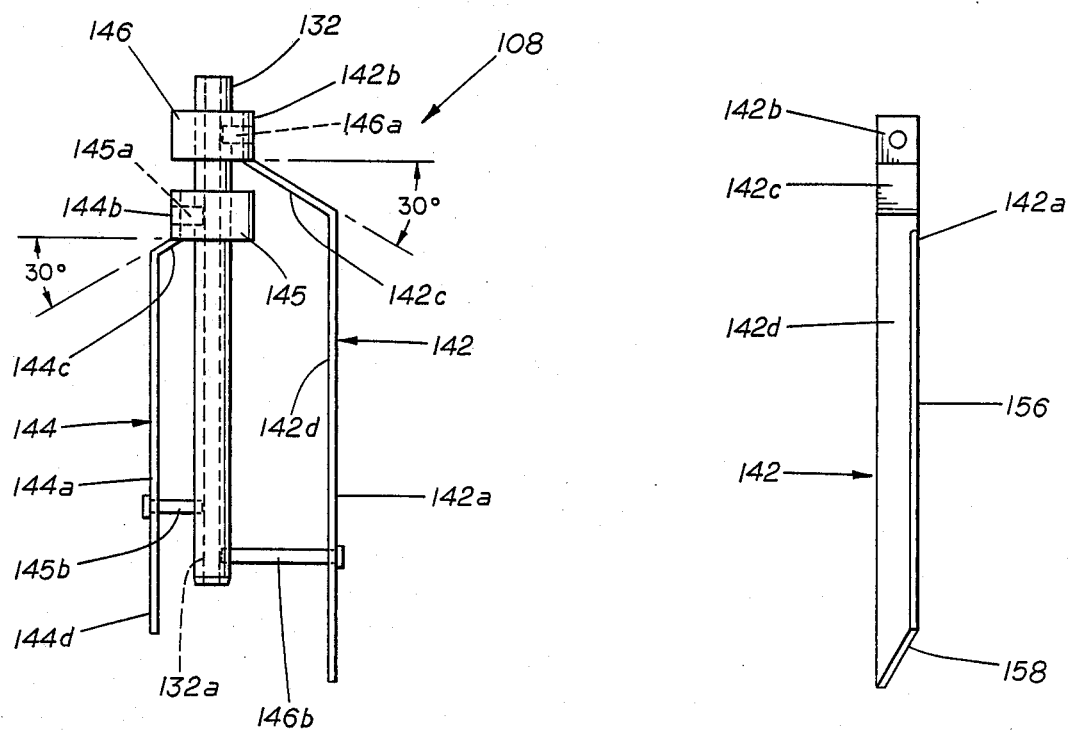
FIG. 12 is a partial side view of an alternate embodiment for the engagement means illustrating the blades for cutting into the ant bed.
FIG. 13 is a side view of a blade of FIG. 12.

Referring to FIG. 12, the inside blades 144a each include an upper mounting section 144b, an angled section 144c and an extended or elongated main section 144d which terminates in an angled or beveled end portion. The upper mounting portion 144b is fitted into a milled pocket in a mounting ring 145 which is mounted about the shaft 132. The mounting ring 145 includes three such milled or machined pockets to receive the upper sections 144b of each of the three blades 144a. A mounting set screw 145a extends through one of the blades and into threaded engagement with the shaft 132 in order to mount the ring and thus the blades for rotation. The main part 144d of the blades 144a is further held in place by a lower connector bolt 145b which extends threadedly through the main blade portion 144d and is threadedly set into the shaft 132. A snap ring (not shown) may be mounted on the back of the blade to further hold the bolt in position.

The outside set of blades 142a each include an upper mounting portion 142b, an angled portion 142c and a main elongated blade portion 142d. Referring to FIG. 13, the blades 142a include a bottom tapered portion 158. Such a bottom tapered portion is also found on the blades 144a. The blades 142a are mounted at upper section 142b to an upper mounting ring 146 which is positioned about the shaft 132. The upper mounting ring includes three milled out portions (not shown) which portions are circumferentially spaced to receive the upper mounting sections 142b of the three blades 142a. A mounting bolt 146a threadedly extends through the ring and one of the blades 142a into threaded engagement with the shaft 132 in order to mount the ring 146 as well as the three blades onto the shaft 132. A lower mounting bolt 146b extends threadedly through one of the blades and into threaded engagement with the shaft 136 in order to further mount the blades. A snap ring (not shown) may be mounted on the inside of the bolt 146 against the blade main portion 142a in order to further mount and fix the mounting bolt 146b to the blade portion 142d.

Referring to FIG. 13, the blade 142 has a milled side edge 156 on the main blade portion 142d and a milled edge on the tapered end portion 158. The milled edges are on the inside of the blades to further enhance cutting through the soil as the blades engage the ground.

The arrangement of the first set of blades 142 in cooperation with the second set of blades 144 creates a turbulence within the ant bed as the destruction member 104 is moved into the ant bed. Simultaneously with the movement of the member into the ant bed, water can be delivered through a bore 132a extending through the shaft 132. A suitable water connection may be made between the shaft 132 and the pump 116. Please note in FIG. 9 the water is delivered to the outside of the rotating blades through the tube 124. These two types of water or other fluid delivery mechanisms may be used simultaneously or in the alternative. As the blades rotate into the ground, the blades break up and mix the ant bed with the inside set of blades 144 cooperating with the outside set of blades to create a particular mixing of the ant bed soil in cooperation with the addition of water to cause a homogeneous mixture of mud to form thus in trapping and drowning ants in the ant bed as well as destroying many of the ants through the rotation of the blades themselves.

The foregoing disclosure and description of the invention are illustrative and explanatory thereof, and various changes in the size, shape and materials, as well as in the details of the illustrated construction may be made without departing from the spirit of the invention.

I claim:

1. A method of destroying ant beds and ants living therein, comprising the steps of:
   positioning a rotating ant bed destruction member over an ant bed;
   moving said rotating ant bed destruction member into engagement with the ant bed in order to destroy the raised portion of the ant bed and honeycomb structure of the ant bed; and
   delivering a stream of fluid into the ant bed for sufficient time to coact with the movement of the destruction member to destroy the structure of the bed and further to kill the ants therein by converting the ant bed into a generally cylindrical homogenized combination of destroyed ant bed honeycomb earth structure and fluid.

2. The method set forth in claim 1, wherein the step of destroying the honeycomb structure of the ant bed includes the steps of:
   moving said ant bed destruction member downwardly into engagement with the ant bed; and
   rotating said ant bed destruction member to destroy the ant bed.

3. The method set forth in claim 1, comprising the step of:
   delivering said fluid at sufficiently high temperature into the ant bed to kill the ants by heat and/or drowning.

4. The method set forth in claim 3, including the step of:
   delivering said fluid of sufficiently high temperature to said ant bed through said ant bed destruction member.

5. The method set forth in claim 3, including:
   delivering said fluid at sufficiently high temperature to yield vapors for further penetrating the bed.

6. Apparatus for destroying ant beds and ants therein, comprising:
   ant bed engagement means including a rotatable destruction member for location over an ant bed and manipulation means for moving said rotatable destruction member into engagement with the ant bed in order to destroy the ant bed honeycomb structure;
   fluid delivery means mounted with said ant bed engagement means for delivering fluid into said ant bed as said rotatable destruction member destroys the ant bed whereby the structure of the ant bed is destroyed and the ants therein are killed ; and
   said destruction member comprising a hollow transverse member in fluid communication with said fluid delivery means and a plurality of vertically extending blades mounted with said hollow transverse member for cutting into an ant bed and means for rotating said plurality of vertically extending blades into said ant bed to combine with said fluid delivery means to destroy the honeycomb structure of the ant bed and create a homogenized mud which traps and drowns any remaining live ants ; and
   a mobile unit including a mobile power package and an operator unit separate from said mobile power package, said operator unit being powered from said mobile power package.

7. The structure set forth in claim 6, wherein said blades include:

a first set of blades including a bottom end portion having an angled cutting edge; and a second set of blades including a bottom end portion having an angled cutting edge opposite to said first set of blades.

8. The structure set forth in claim 6, wherein:

said first set of blades and second set of blades each having an end blade, said end blades being inclined outwardly with respect to said other blades and being parallel to each other.

9. The structure set forth in claim 6, wherein said fluid delivery means includes:

blade fluid delivery means mounted with said plurality of blades for delivering fluid in proximity to said blades as said blades cut into the ant bed.

10. The structure set forth in claim 6, including:

said vertically extending blades are hollow and in fluid communication with said hollow transverse member.

11. The structure set forth in claim 6, wherein said fluid delivery means includes means for delivering fluid to said ant bed at sufficiently high temperature to kill at least some of said ants by heat.

12. The structure set forth in claim 11, wherein:

said means for delivering fluid at sufficiently high heat causes vaporization of some delivered fluid in said bed to further penetrate the bed and destroy ants.

13. The structure set forth in claim 6, including:

said operator unit including a frame and wheel means mounted with said frame for rollingly engaging the ground;

rotation mount means mounted with said frame for rotating said ant bed destruction member; and said fluid delivery means being mounted with said frame and with said ant bed destruction member.

14. The structure set forth in claim 13, including:

said fluid delivery means further includes a fluid pump means and fluid tank mounted with said mobile power package for delivering fluid under pressure to said fluid delivery means mounted with said frame.

15. The structure set forth in claim 14, including:

said rotation mount means including motor means mounted with said ant bed destruction member for rotating same; and motor drive means mounted with said mobile power package and remotely connected to said motor means to drive said motor for rotating said ant bed destruction member.

16. The structure set forth in claim 14, including:

motor drive means mounted and powered on said frame for rotating said ant bed engagement means for engagement with said ant bed.

17. The structure set forth in claim 15, including:

a traveling frame support means for yieldably holding said frame in a normal position for travel and providing means to allow said frame to be lowered toward the ground.

* * * * *